United States Patent [19]

Castillo et al.

[11] Patent Number: 5,573,259
[45] Date of Patent: Nov. 12, 1996

[54] BICYCLE TRAILER

[76] Inventors: Michael S. Castillo, 2138 Via Teca, San Clemente, Calif. 92673; Edward L. Castillo, 25781 Dillon Rd., Laguna Hills, Calif. 92653

[21] Appl. No.: 270,124

[22] Filed: Jul. 1, 1994

[51] Int. Cl.⁶ .................................................. B62J 7/00
[52] U.S. Cl. ...................... 280/204; 280/292; 280/494; 280/656; 280/47.331
[58] Field of Search .................................. 280/204, 292, 280/656, 1.5, 47.32, 47.331, 78, 488, 494, 491.3

[56] References Cited

U.S. PATENT DOCUMENTS

| | | | |
|---|---|---|---|
| 2,260,676 | 10/1941 | Lafaye | 280/47.331 |
| 2,756,069 | 7/1956 | Manngarn | 280/204 |
| 4,266,793 | 5/1981 | Pryor | 280/204 |
| 5,067,738 | 11/1991 | O'Connor | 280/204 |
| 5,098,113 | 3/1992 | Albitre | 280/204 |
| 5,348,327 | 4/1994 | Gieske | 280/204 |

FOREIGN PATENT DOCUMENTS

| | | | |
|---|---|---|---|
| 0794900 | 2/1936 | France | 280/204 |
| 0090321 | 2/1934 | Sweden | 280/204 |
| 8600054 | 1/1986 | WIPO | 280/1.5 |

*Primary Examiner*—Anne Marie Boehler
*Attorney, Agent, or Firm*—Stetina Brunda & Buyan

[57] ABSTRACT

A bicycle trailer comprising an elongate support member having proximal and distal ends, the distal end having a wheel depending therefrom and the proximal end being attachable, via a connector, to a conventional bicycle. In a preferred embodiment, the elongate support member is pivotally connected to the connector. The connector is mountable to a seat post of the bicycle and is further configured to allow the support member to rotate relative to the seat post. The support member includes at least one rack member attached thereto upon which objects may be placed and secured.

15 Claims, 2 Drawing Sheets

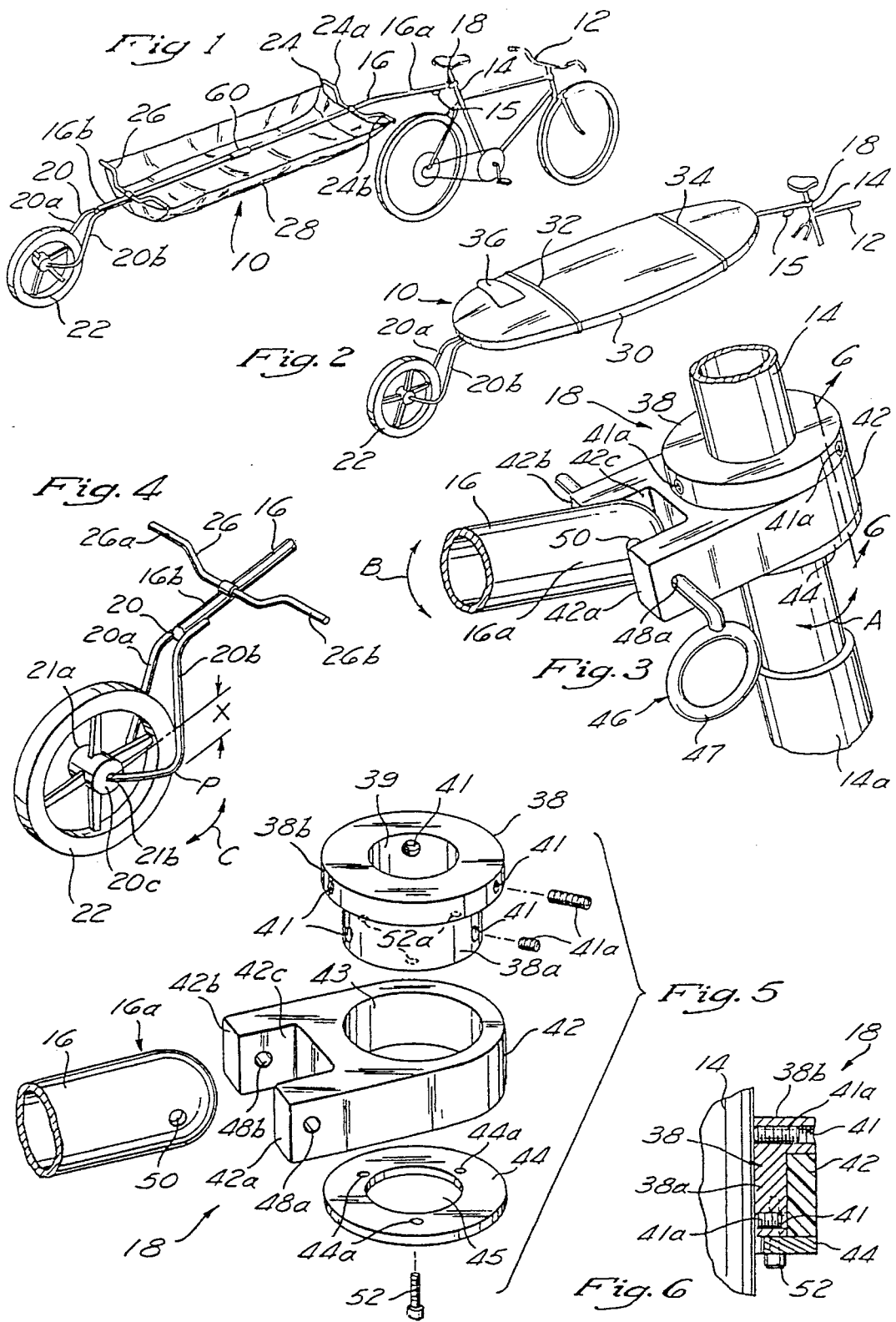

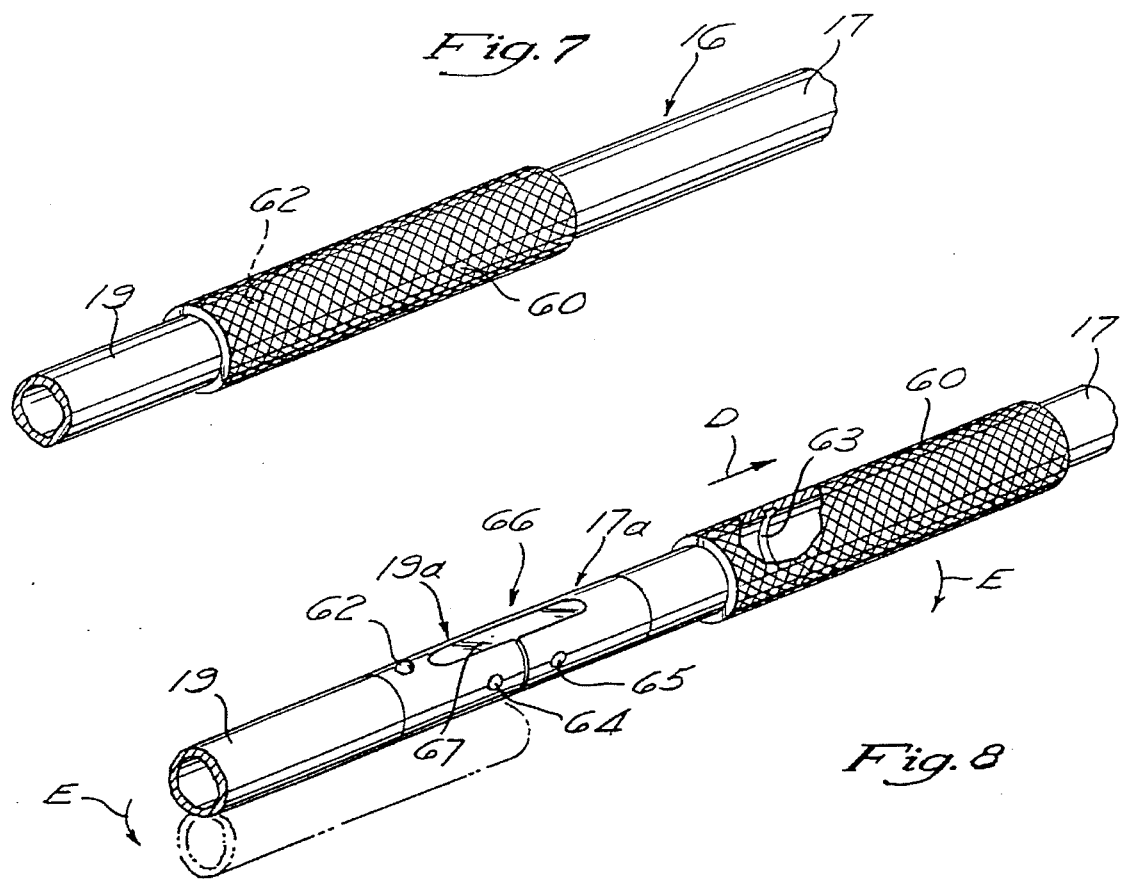
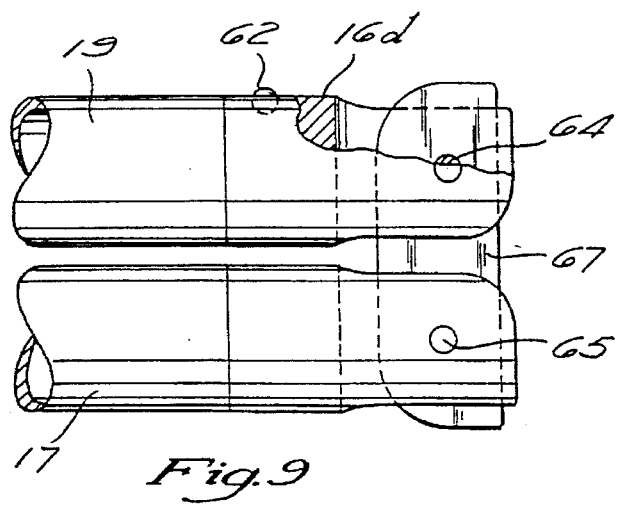

5,573,259

BICYCLE TRAILER

FIELD OF THE INVENTION

The present invention relates generally to trailer devices, and more particularly to a trailer assembly for attachment to a convention bicycle, motorcycle, motor scooter, or the like.

BACKGROUND OF THE INVENTION

The sport of surfing, though having participants of all ages, has a particularly large segment of teenage and young adult participants. Many of these teenage participants are not of age to drive a vehicle or other form of motorized transportation in which they may carry their surfboard when traveling to a beach or other surfing area. Further, many surfing area beaches are located remote from vehicle highways or parking lots and are only accessible via walkways or pathways. On the other hand, many beaches and surfing areas are extremely popular and, as a result, leave surfers faced with considerable traffic congestion when trying to travel to and from such areas. As such, many surfers find that bicycling to such areas is, in fact, a most preferred method of transportation. Thus, many individuals rely on bicycles as a preliminary mode of transportation and therefore must carry their surfboard with them when riding their bicycle to the beach. As can be appreciated, because of the relatively large size and configuration of a surfboard, carrying a surfboard while riding a bicycle is extremely difficult as well as potentially dangerous.

To overcome the hardship of riding a bicycle while simultaneously carrying a surfboard, a number of surfboard trailer devices have been developed and are currently known in the prior art. However, such known surfboard trailer devices possess certain inherent deficiencies which detract from their overall utility.

One such prior art surfboard trailer device comprises a generally triangular carrier mountable to the rear portion of the bicycle. The carrier includes first and second support members attached to the rear axle of a bicycle in a manner wherein the first support member extends generally horizontally rearward from the rear axle and the second support member extends generally vertically upward from the rear axle. The surfboard is affixed to the outer ends of the first and second support members in a generally angular orientation. In using this particular trailer device, however, the support members may not be easily removed from the rear axle of the bicycle. Thus, when it is desired to use the bicycle at a time when a surfboard is not being transported thereon, one must undergo a difficult and time consuming process to remove the support members from the rear axle.

A second prior art surfboard trailer device comprises an elongate support member having a first end attached to the seat support post of a bicycle and a second end terminating in a transversely extending axle having wheels placed on the opposed ends thereof. In this particular device, however, the wheels disposed on the opposed ends of the transversely extending axle create a wheel track which does not follow the track of the rear wheel of the bicycle itself. This particular occurrence makes control of the surfboard trailing the bicycle extremely difficult, particularly when traveling around curbs or corners.

As such, there is a need in the art to provide a bicycle trailer capable of supporting a surfboard secured thereon that does not interfere with the rider's vision or ability to ride the bicycle. Additionally, there is a need in the art to provide a bicycle trailer that is easy to assemble and further, provides means for carrying other personal objects such as towels, frisbees and the like.

SUMMARY OF THE INVENTION

The present invention specifically addresses and alleviates the above-identified deficiencies in the art. More specifically, the present invention relates to a bicycle trailer comprising an elongate support member having proximal and distal ends wherein at least one wheel depends from the distal end and the proximal end is attachable, via a connector, to a conventional bicycle. The support member includes at least one rack member attached thereto upon which an object such as a surfboard may be placed and secured. The support member preferably has two rack members attached thereto which are disposed in spaced relation. A utility storage bag may be provided which is attachable to and suspended from the first and second rack members and extends longitudinally underneath a portion of the support member when attached to the rack members.

The bicycle trailer of the invention also preferably includes a wheel attachment assembly comprising a fork-shaped member attached to and extending from the distal end of the support member. The fork-shaped member includes an opposed pair of prongs, with the wheel being disposed between and rotatably connected to the distal ends of the prongs. The prongs of the wheel attachment assembly initially extend at a downward angle relative to the support member and subsequently curve upwardly to allow the wheel to overcome obstacles such as curbs and rocks, when pulled thereacross. Disposed intermediate the proximal and distal ends of the support member is a joint and tubular sleeve which is selectively positionable about the joint in overlapping relation. When the sleeve is positioned over the joint, the support member is maintained in a first extended position. When the sleeve is retracted from the joint, the support member may be articulated to a second collapsed position which allows the user to easily store and handle the trailer when the same is not in use.

In a preferred embodiment, the connector utilized to attach the support member to the bicycle is mountable upon the seat post of a conventional bicycle and is designed and configured to allow the support member to rotate about the seat post. Further, the connector is preferably designed and configured to allow the support member to pivot relative thereto.

The connector preferably comprises three parts, namely an annular collar, a generally U-shaped member and a annular member, all of which cooperate to form a structure attachable to the seat post of the bicycle. The U-shaped member is disposed between the collar and the annular member, and is adapted to freely rotate therebetween. Additionally, the U-shaped member defines a coaxially aligned pair of apertures through which a locking pin may be extended. The locking pin is further extensible through an aperture formed in the proximal end of the support member and is used to facilitate the pivotal connection of the support member to the connector.

It is therefore an object of the present invention to provide a bicycle trailer which is configured to facilitate the towing of a surfboard behind a bicycle.

Another object of the present invention is to provide a bicycle trailer that allows objects such as surfboards to be towed without obscuring the vision of the bicycle rider.

Another object of the present invention is to provide a bicycle trailer that is rotatable about and pivotably connected to the frame of the bicycle.

Another object of the present invention is to provide a bicycle trailer capable of overcoming obstacles, such as curbs and/or rocks, which are taller than the radius of the wheel thereof.

Another object of the present invention is to provide a bicycle trailer that is easy to assemble and may be rapidly attached to and detached from a bicycle.

Another object of the present invention is to provide a bicycle trailer that does not interfere with the operation of the bicycle when the bicycle is in use.

Another object of the present invention is to provide a bicycle trailer which is collapsible to facilitate the space-efficient storage thereof.

A still further object of the present invention is to provide a bicycle trailer fabricated from durable materials yet lightweight and easy to manufacture.

BRIEF DESCRIPTION OF THE DRAWINGS

FIG. 1 is a perspective view of a bicycle trailer constructed in accordance with a preferred embodiment of the present as attached to a conventional bicycle;

FIG. 2 is a perspective view of the bicycle trailer having a surfboard placed thereon and secured thereto;

FIG. 3 is a perspective view of a connector of the bicycle trailer for facilitating the attachment thereof to the bicycle;

FIG. 4 is a perspective view of a wheel attachment assembly of the bicycle trailer;

FIG. 5 is an exploded view of the connector depicted in FIG. 3;

FIG. 6 is a cross-sectional view taken along Lines 6—6 of FIG. 3;

FIG. 7 is a perspective view of a joint disposed within the support member of the bicycle trailer and accompanying tubular sleeve which is slidably extensible over the joint for maintaining the support member in a first extended position;

FIG. 8 is a perspective view of the joint as exposed by the longitudinal retraction of the sleeve; and FIG. 9 is a side elevational view of the support member in a second collapsed position.

DETAILED DESCRIPTION OF THE PREFERRED EMBODIMENT

Referring now to FIGS. 1–6, there is shown a bicycle trailer 10 constructed in accordance with a preferred embodiment of the present invention. The trailer 10 comprises an elongate support member 16 having a proximal end 16a and a distal end 16b. Rigidly attached to the underside of the support member 16 adjacent its distal end 16b is a loop member 15, the use of which will be discussed below. The proximal end 16a of the support member 16 is preferably connected to a conventional bicycle 12 by a connector 18, more clearly depicted in FIGS. 3 and 5. In the preferred embodiment, the connector 18 is mounted upon the seat post 14 of the bicycle 12 such that the support member 16 extends behind and may be pulled by the bicycle 12. As will be recognized, however, the trailer 10 of the present invention may also be adapted to be connected to other vehicles such as motorcycles, motorscooters and the like.

The distal end 16b of the support member 16 preferably has at least one wheel 22 depending therefrom. In the preferred embodiment, a wheel attachment assembly 20 is used to facilitate the rotatable connection of the wheel 22 to the distal end 16b of the support member 16. As best seen in FIG. 4, the wheel attachment assembly 20 preferably comprises a generally fork-shaped member having a horizontally extending proximal portion 20 attached to the distal end 16b of the support member 16. Extending distally from the proximal portion 20 of the wheel attachment 20 assembly are two (2) identically configured, arcuately contoured prongs 20a, 20b which are oriented as mirror images of each other. The prongs 20a, 20b extend downwardly from the proximal portion 20 at an angle, then subsequently curve upwardly such that the distal ends 21a, 21b thereof are disposed above their lowermost points P by the distance X. The wheel 22 defines a hub 20c which is rotatable about an axle (as depicted by the letter C) extending between and attached to the distal ends 21a, 21b of the prongs 20a, 20b. Due to the configuration of the prongs 20a, 20b, the axle of the wheel 22 is disposed above the lowermost points P thereof by the distance X. Advantageously, the initial extension of the prongs 20a, 20b at a downward angle from the proximal portion 20 and subsequent upward curvature thereof (resulting in the orientation of the axle above the lowermost points P) facilitates the formation of a ramp in front of the wheel 22 which allows the same to climb over vertical obstacles, such as curbs and rocks, which are taller than the radius of the wheel 22.

The support member 16 is preferably provided with at least one rack member capable of supporting an object (such as a surfboard 30) placed thereon. As depicted in FIG. 1, the support member 16 preferably includes two (2) rack members attached thereto, namely a first rack member 24 disposed adjacent its proximal end 16a and second rack member 26 disposed adjacent its distal end 16b. In the preferred embodiment, each rack member 24, 26 defines two (2) identically configured portions such as 24a, 24b, 26a, 26b which extend in opposite directions as depicted in FIG. 4. The portions 24a, 24b, 26a, 26b each include intermediate bends which are upwardly angled to allow an object or objects to be placed thereon. The first and second rack members 24, 26 are preferably positioned on the support member 16 to support a surfboard 30, as depicted in FIG. 2. The surfboard 30 is longitudinally extended over the first and second rack members 24, 26 such that its fin 36 extends upwardly. The surfboard 30 is secured to the first and second rack members 24, 26 via ropes or bungee cords 34, 32. The cords 32, 34 provide a means of attaching the surfboard 30 to the trailer 10 in a quick and easy manner. The cords 32, 34 may be provided with adjustable ends to facilitate the selective increase or decrease in the lengths thereof. In this respect, the required length of the cords 32, 34 is dependent upon the girth of the loads which are to be carried upon the trailer 10. Additionally, the trailer 10 of the present invention allows for surfboard 30 to be towed in a manner not obscuring the view of the rider of the bicycle 12. Furthermore, such arrangement between the trailer 10 and surfboard 30 produces a more rigid and secure apparatus in that the combination of the interconnected surfboard 30 and first and second rack members 24, 26 of the support member 16 cooperate to impart greater rigidity and strength to the trailer 10 than in trailers currently in use. Due to the resultant increase in stiffness and strength achieved by the connection of the surfboard 30 and trailer 10 to each other, the trailer 10 of the present invention may be fabricated from lighter materials, thus enhancing the mobility of the same.

In addition to providing a system for transporting a surfboard, the trailer 10 of the present invention preferably includes a utility storage bag 28 attachable to the first and second rack members 24, 26. As shown in FIG. 1, the utility storage bag 28 generally comprises an elongate hammock member having ends attachable to respective ones of the rack member 24, 26. As illustrated, the utility storage bag 28 is suspended from the first and second rack members 24, 26 such that the utility storage bag 28 extends longitudinally underneath a portion of the support member 16. While in this configuration, objects such as beach towels, frisbees, beverages and the like may be stored therein and transported. As will be recognized, the utility storage bag 28 may take a number of different forms and may further include pockets or pouches having zipper or snap closures to better to secure such items during transport.

Referring now to FIGS. 3 and 5, illustrated is a connector 18 for facilitating the releasable attachment of the support member 16 to the bicycle 12. In the preferred embodiment, the connector 18 is adapted to be mountable to the seat post 14 of the bicycle 12. The connector 18 preferably comprises a generally U-shaped member 42 which defines a central opening 43 and a pair of identically configured ears 42a, 42b which extend therefrom in opposed relation and define a gap 42c therebetween. Disposed within respective ones of the ears 42a, 42b are apertures 48a, 48b which are coaxially aligned with each other. Importantly, the space or gap 42c defined between the ears 42a, 42b is sized to accommodate the proximal end 16a of the support member 16.

In addition to the member 42, the connector 28 comprises a collar 38 which includes a bore 39 extending axially therethrough and defines a cylindrically configured body portion 38a having a flange portion 38b extending radially from one end thereof. The bore 39 of the collar 38 is sized and configured to slidably receive the seat post 14, with the main body portion 38a being sized to be slidably receivable into the opening 43 of the member 42. In this respect, the member 42 is free to rotate about the outer surface of the main body portion 38a subsequent to the insertion of the collar 38 into the opening 43 thereof.

To facilitate the rigid attachment of the collar 38 to the seat post 14 subsequent to the extension thereof through the bore 39, disposed within the peripheral edge of the flange portion 38b and about the main body portion 38a are a plurality of apertures 41. In particular, the flange portion 38b preferably includes three (3) apertures 41 disposed therein in equidistantly spaced intervals of approximately 120 degrees. Similarly, the main body portion 38a preferably includes three (3) apertures 41 disposed therein in equidistantly spaced intervals of approximately 120 degrees. Each of the apertures 41 disposed within the flange portion 38b and main body portion 38a extend laterally into communication with the central bore 39 and are internally threaded. In this respect, each of the apertures 41 is adapted to threadably receive a set screw 41a. As best seen in FIG. 5, due to the radial extension of the flange portion 38b from the main body portion 38a, those set screws 41a inserted into the apertures 41 of the main body portion 38a are of a shorter length than those inserted into the apertures 41 disposed within the flange portion 38b. As will be recognized, subsequent to the extension of the seat post 14 through the bore 39, the tightening of the set screws 41a facilitates the rigid attachment of the collar 38 to the seat post 14. Importantly, the set screws 41a inserted into the main body portion 38a, when tightened, do not protrude beyond the outer surface of the main body portion 38a, and thus do not interfere with the rotation of the member 42 therearound. It will be recognized that the collar 38 may be provided with more or less than six (6) set screws 41a to facilitate the rigid attachment thereof to the seat post 14. Additionally, the set screw receiving apertures 41 may be disposed exclusively in the main body portion 38a or flange portion 38b of the collar 38.

To maintain the member 42 in rotatable engagement to the collar 38, the connector 18 further comprises an annular member 44. The annular member 44 itself defines a central opening 45 which has a diameter equal to or greater than the diameter of the bore 39 of the collar 38, i.e., is sized to slidably receive the seat post 14. Disposed within the member 44 in close proximity to the central opening 45 thereof are three (3) apertures 44a which are oriented in equidistantly spaced intervals of approximately 120 degrees. As best seen in FIG. 6, the member 44 is attachable to the main body portion 38a of the collar 38 via the extension of fasteners such as screws 52 through the apertures 44a and into complimentary internally threaded apertures 52a disposed in the distal rim of the main body portion 38a. Importantly, the attachment of the member 44 to the collar 38 maintains the member 42 in rotatable engagement to the collar 38. In the preferred embodiment, the depth of the central opening 43 is substantially equal to the length of the main body portion 38a. In this respect, when the main body portion 38a is fully received into the central opening 43 (i.e., the flange portion 38b is abutted against the member 42), the rim of the main body portion 38a is substantially flush with the member 42. The subsequent attachment of the member 44 to the collar 38 facilitates the capture of the member 42 between the flange portion 38b and the peripheral region of the member 44. However, the member 42 is not compressed between the flange portion 38b and member 44, but rather is slidably rotatable therebetween.

Though not shown, an internally threaded annular lock ring may be utilized as an alternative to the member 44 to capture the member 42. In this respect, the length of the main body portion 38a of the collar 38 may be sized to exceed the depth of the central opening 43 and thus protrude outwardly therefrom when the member 42 is abutted against the flange portion 38b. The end of the main body portion 38a extending beyond the member 42 is externally threaded for purposes of allowing the same to be threadably engaged to the lock ring. As will be recognized, the engagement of the lock ring to the collar 38 facilitates the capture of the member 42 in the same manner as accomplished through the utilization of the member 44. As an alternative to the end of the main body portion 38a being externally threaded, the same may be provided with an annular groove formed thereabout which is adapted to receive a snap ring which functions in the same manner as the annular lock ring.

The attachment of the connector 18 to the seat post 14 is accomplished by initially removing the seat post 14 from within the seat tube 14a of the bicycle 12. Thereafter, the end of the seat post 14 not having the bicycle seat attached therethrough is slidably extended through the bore 39 of the collar 38. The collar 38 is oriented on the seat post 14 such that the flange portion 38b thereof is disposed closest to the bicycle seat. The seat post 14 is then extended through the central opening 43 of the member 42 and opening 45 of the member 44 in succession. Thereafter, the seat post 14 is re-inserted into the seat tube 14a. Once the collar 38 has been oriented at a desired position along the seat post 14, all six (6) set screws 41a are tightened, thus rigidly securing the collar 38 to the seat post 14. Thereafter, the member 42, and in particular the central opening 43 thereof, is extended over the outer surface of the main body portion 38a, with such extension being limited by the abutment of the member 42 against the flange portion 38b. The member 44 is then raised into contact with the rim of the main body portion 38a and member 42, and subsequently attached to the collar 38 in the aforementioned manner. As previously indicated, the attachment of the member 44 to the collar 38 maintains the member 42 in rotatable engagement to the collar 38, and in particular the outer surface of the main body portion 38a thereof.

In the preferred embodiment, the support member 16 of the trailer 10 is pivotally connectable to the connector 18. Such pivotal connection is facilitated by the initial placement of the proximal end 16a of the support member 16 into the gap 42c defined between the ears 42a, 42b of the member 42. Importantly, the proximal end 16a is oriented within the gap 42c such that an aperture 50 extending laterally therethrough is coaxially aligned with the apertures 48a, 48b disposed within the ears 42a, 42b. Thereafter, an elongate locking pin 46 having a loop 47 disposed on one end thereof is slidably extended through the coaxially aligned apertures 48a, 48b, 50, thus pivotally connecting the support member 16 to the connector 18. As will be recognized, the utilization of the locking pin 46 allows the support member 16 to be quickly and easily attached to and detached from the connector 18. The pivotal connection of the support member 16 to the connector 18 via the locking pin 46 is preferably accomplished subsequent to the attachment of the connector 18 to the seat post 14 in the aforementioned manner. Advantageously, the ability of the support member 16 to pivot and rotate relative the seat post 14 due to the configuration of the connector 18 allows the trailer 10 to be pulled by the bicycle 12 without interfering with the rider's ability to properly handle and control the bicycle, particularly around turns or when passing over bumps or other obstructions. To enhance its rotational movement about the outer surface of the main body portion 38a, the member 42 is preferably fabricated from a self-lubricating material such as DELRIN.

Referring now to FIGS. 1 and 7–9, the trailer 10 constructed in accordance with the present invention is preferably adapted to be collapsible so as to facilitate the compact storage thereof when the same is not in use. In the preferred embodiment, disposed intermediate the proximal and distal ends 16a, 16b of the support member 16 is a joint 66. The support member 16 preferably comprises a proximal segment 17 and a distal segment 19. Pivotally connected to the proximal end 19a of the distal segment 19 via a fastener 64 is one end of an elongate link member 67. The opposite end of the link member 67 is pivotally connected to the distal end 17a of the proximal segment 17 via a fastener 65. As will be recognized, the proximal end 19a of the distal segment 19, distal end 17a of the proximal segment 17 and link member 67, when attached to each other in the aforementioned manner, define the joint 66. As best seen in FIG. 8, the link member 67 resides within a complimentary slot defined within the segments 17, 19 when the same are oriented in end-to-end fashion. The configuration of the link member 67 and its associated slot are such that subsequent to the attachment of the link member 67 to the segments 17, 19 via the fasteners 64, 65, each of the segments 17, 19 may only be rotated downwardly, as depicted by the letter E. In particular, the proximal segment 17 may only be rotated in a clockwise direction relative the link member 67, with the distal segment 19 being rotatable only in a counter-clockwise direction relative the link member 67. As best seen in FIG. 9, the incorporation of the joint 66, and in particular the link member 67, into the support member 16 allows the sauna to be collapsed in a manner wherein the segments 17, 19 extend in generally parallel relation to one another.

In the preferred embodiment, the support member 16 is preferably provided with an elongate, tubular sleeve 60 which is slidably attached to the proximal segment 17 of the support member 16 and adapted to be selectively extensible over (i.e., overlap) the joint 66 so as to prevent the collapse of the support member 16 and maintain the same in an extended orientation. The sleeve 60 is normally disposed in the orientation shown in FIG. 7, i.e., overlapping the joint 66. The sleeve 60 is maintained in position over the joint 66 via a spring-biased engagement mechanism 62 disposed within the distal segment 19 adjacent its proximal end 19a. In this respect, when the sleeve 60 is slidably extended over the joint 66, the semi-spherical abutment surface of the engagement mechanism 62 is received into an annular detent groove 63 formed in the inner surface of the sleeve 60 thus preventing the same from moving longitudinally along the support member 16. When it is desired to collapse the support member 16, the sleeve 60 is pulled longitudinally in the direction D along the proximal segment 17, thus exposing the joint 66. As will be recognized, the holding force exerted on the sleeve 60 by the by the receipt of the abutment surface of the engagement mechanism 62 into the groove 63 is easily overcome when the sleeve 60 is pulled longitudinally in the direction D. When the joint 66 is exposed, the support member 16 may be collapsed in the manner shown in FIG. 9. When use of the trailer 10 is desired, the support member 16 is re-extended into the configuration shown in FIG. 8, with the sleeve 60 subsequently being slid longitudinally toward the distal segment 19 and into overlapping relation with the joint 66. As the sleeve 60 is extended over the joint 66, the abutment surface of the engagement mechanism 62 is forced inwardly into the distal segment 19, thus allowing the same to be receivable into the groove 63 and maintain the sleeve 60 in position over the joint 66. It will be recognized that the sleeve 60 need not be provided with the groove 63 in that the outward biasing force exerted by the engagement mechanism 62 thereagainst is sufficient to maintain the sleeve 60 in position over the joint 66. As previously indicated, the incorporation of the joint 66 into the support member 16 facilitates the compact storage of the trailer 10 by allowing the support member 16 to assume a collapsed orientation.

As previously explained, the bicycle trailer 10 constructed in accordance with the present invention is utilized by initially attaching the connector 18 to the seat post 14 of the bicycle 12 in the aforementioned manner. Subsequent to the extension of the support member 16 and placement of the sleeve 60 in overlapping relation to the joint 66, the proximal end 16a of the support member 16 is pivotally connected to the connector 18 via the locking pin 46, as previously described. Thereafter, the surfboard 30 or other cargo may be placed upon the first and second rack members 24, 26 and secured thereto. Additionally, other types of objects may be placed into the utility storage bag 28 either before or after the placement of the cargo upon the first and second rack members 24, 26. In the event the bicycle 12 and accompanying trailer 10 are to be left unattended at a certain location, an elongate chain may be extended through the loop member 15, about a portion of the bicycle frame, and around an object such as a bicycle rack or tree, thus preventing the theft of the bicycle 12 and/or trailer 10. The chain may be further extended through the loop 47 of the locking pin 46 to prevent the same from being slidably removed from within the connector 18. After use of the trailer 10 has been completed, the locking pin 46 is removed from the connector 18, thus releasing the support member 16 from its pivotal connection thereto. After the surfboard 30 or other cargo has been removed from the rack members 24, 26, the joint 66 is exposed by longitudinally sliding the sleeve 60 in the aforementioned manner, thus allowing the support member 16 to be collapsed for easy storage. It will be recognized that alternative methods of attaching the connector 18 to the seat post 14 are contemplated herein. In this respect, such attachment may be accomplished by removing the bicycle seat from the top end of the seat post 14, and placing the various components comprising the connector 18 onto the seat post 14 in a proper sequence as needed to facilitate the subsequent assembly of the connector 18 in its proper configuration.

Additional modifications and improvements of the present invention may also be apparent to those skilled in the art. Thus, the particular combination of parts described and illustrated herein is intended to represent only one embodiment of the present invention, and is not intended to serve as limitations of alternative devices within the spirit and scope of the invention.

What is claimed is:

1. A bicycle trailer configured for attachment to a bicycle frame, said bicycle trailer comprising:

(a) an elongate support member having proximal and distal ends and at least one wheel rotatably connected to said distal end;

(b) first and second rack members attached to said support member in spaced relation;

(c) a utility storage bag having a first end attached to said first rack member and a second end attached to said second rack member such that said utility storage bag is suspended from and extends longitudinally beneath said support member; and (d) a connector rigidly mountable to said bicycle frame, the proximal end of said support member being pivotally connected to said connector and selectively detachable therefrom.

2. The bicycle trailer of claim 1 wherein said wheel is rotatably connected to said support member via a wheel attachment assembly defining a proximal portion having an opposed pair of prongs extending distally therefrom, said proximal portion of said wheel attachment assembly being attached to said distal end of said support member and said wheel being disposed between and rotatably connected to said prongs.

3. The bicycle trailer of claim 2 wherein said prongs each define an arcuate region and are configured in a manner wherein the center of the wheel is disposed above the apex of each arcuate region when rotatably connected to the prongs.

4. The bicycle trailer of claim 1 wherein said support member further includes a joint disposed intermediate the proximal and distal end thereof, said joint being adapted to allow said support member to be selectively movable between a first extended position and a second collapsed position.

5. The bicycle trailer of claim 4 further comprising a tubular sleeve slidably attached to said support member and selectively extensible over said joint, said support member being maintained in said first extended position when said joint is covered by said sleeve.

6. The bicycle trailer of claim 5 further comprising an outwardly biased engagement mechanism disposed within said support member for maintaining said sleeve in position over said joint.

7. A bicycle trailer configured for attachment to a bicycle frame having a seat post, said bicycle trailer comprising:

(a) an elongate support member having proximal and distal ends and at least one wheel rotatably connected to said distal end;

(b) a collar rigidly mountable to the seat post of the bicycle frame;

(c) a generally U-shaped member disposed upon and adapted to freely rotate about said collar, said U-shaped member defining at least one aperture therethrough; and (d) an annular member attached to said collar, said annular member being adapted to maintain said U-shaped member in rotatable engagement to said collar when attached thereto;

the proximal end of said support member being pivotally connected to said U-shaped member via a locking pin which is slidably extensible through the support member and the aperture of the U-shaped member.

8. The bicycle trailer of claim 7 wherein:

(a) said collar includes a plurality of apertures disposed therein for receiving fasteners for rigidly mounting said collar to said seat post; and (b) said annular member includes a plurality of apertures disposed therein for allowing fasteners to be extended into said collar to facilitate the rigid attachment of said annular member to said collar.

9. The bicycle trailer of claim 7 wherein said U-shaped member is fabricated from a self-lubricating material.

10. The bicycle trailer of claim 7 wherein said wheel is rotatably connected to said support member via a wheel attachment assembly defining a proximal portion having an opposed pair of prongs extending distally therefrom, said proximal portion of said wheel attachment assembly being attached to said distal end of said support member and said wheel being disposed between and rotatably connected to said prongs.

11. The bicycle trailer of claim 10 wherein said prongs each define an arcuate region and are configured in a manner wherein the center of the wheel is disposed above the apex of each arcuate region when rotatably connected to the prongs.

12. The bicycle trailer of claim 7 wherein said support member further includes a joint disposed intermediate the proximal and distal end thereof, said joint being adapted to allow said support member to be selectively movable between a first extended position and a second collapsed position.

13. The bicycle trailer of claim 12 further comprising a tubular sleeve slidably attached to said support member and selectively extensible over said joint, said support member being maintained in said first extended position when said joint is covered by said sleeve.

14. The bicycle trailer of claim 13 further comprising an outwardly biased engagement mechanism disposed within said support member for maintaining said sleeve in position over said joint.

15. A bicycle trailer configured for attachment to a bicycle frame, said bicycle trailer comprising:

(a) an elongate support member having proximal and distal ends and at least one wheel rotatably connected to said distal end;

(b) said support member further includes a joint disposed intermediate the proximal and distal end thereof, said joint being adapted to allow said support member to be selectively movable between a first extended position and a second collapsed position;

(c) a tubular sleeve slidably attached to said support member and selectively extensible over said joint, said support member being maintained in said first extended position when said joint is covered by said sleeve;

(d) an outwardly biased engagement mechanism disposed within said support member for maintaining said sleeve in position over said joint; and (e) a connector rigidly attachable to said bicycle, the proximal end of said support member being pivotally connected to said connector and selectively detachable therefrom.

* * * * *